(12) United States Patent
Aue et al.

(10) Patent No.: US 10,990,381 B2
(45) Date of Patent: Apr. 27, 2021

(54) METHOD AND DEVICE FOR UPDATING A PROGRAM

(71) Applicant: Robert Bosch GmbH, Stuttgart (DE)

(72) Inventors: Axel Aue, Korntal-Muenchingen (DE); Hans-Walter Schmitt, Weissach/Flacht (DE); Matthias Schreiber, Vaihngen/Enz (DE)

(73) Assignee: Robert Bosch GmbH, Stuttgart (DE)

( * ) Notice: Subject to any disclaimer, the term of this patent is extended or adjusted under 35 U.S.C. 154(b) by 0 days.

(21) Appl. No.: 16/497,905

(22) PCT Filed: Mar. 6, 2018

(86) PCT No.: PCT/EP2018/055466
§ 371 (c)(1),
(2) Date: Sep. 26, 2019

(87) PCT Pub. No.: WO2018/177698
PCT Pub. Date: Oct. 4, 2018

(65) Prior Publication Data
US 2020/0026509 A1    Jan. 23, 2020

(30) Foreign Application Priority Data
Mar. 29, 2017   (DE) ..................... 10 2017 205 274.0

(51) Int. Cl.
*G06F 8/654* (2018.01)
*G06F 8/656* (2018.01)
(Continued)

(52) U.S. Cl.
CPC .............. *G06F 8/654* (2018.02); *G06F 8/656* (2018.02); *G06F 9/322* (2013.01); *G06F 9/445* (2013.01); *G06F 12/0246* (2013.01)

(58) Field of Classification Search
CPC ...... G06F 8/654; G06F 8/656; G06F 8/60–66; G06F 9/322; G06F 9/328; G06F 9/445;
(Continued)

(56) References Cited

U.S. PATENT DOCUMENTS

| 7,502,813 | B2 * | 3/2009 | Ljung | ..................... G06F 8/654 |
| 7,886,287 | B1 * | 2/2011 | Davda | ..................... G06F 9/322 |
| | | | | 717/168 |

(Continued)

FOREIGN PATENT DOCUMENTS

| DE | 102014223035 A1 | 5/2016 |
| JP | 2008546067 A | 12/2008 |

OTHER PUBLICATIONS

J. Lee and D. Shin, "Adaptive Paired Page Prebackup Scheme for MLC NAND Flash Memory," in IEEE Transactions on Computer-Aided Design of Integrated Circuits and Systems, vol. 33, No. 7, pp. 1110-1114, Jul. 2014, doi: 10.1109/TCAD.2014.2309857. (Year: 2014).*

(Continued)

*Primary Examiner* — Andrew M. Lyons
(74) *Attorney, Agent, or Firm* — Norton Rose Fulbright US LLP; Gerard Messina

(57) ABSTRACT

A method updating a program in a flash memory includes executing a first image of the program while an address space of the program is imaged onto the memory blocks, which are operated in a single-level mode; copying part of the first image from a range within the address space, which is imaged onto one of the blocks, into a backup block; setting the one of the blocks to a multi-level mode; while the address range is imaged onto the backup block, programming the one of the blocks with part of the second image besides for the part of the first image; switching the address range back to the block while the block remains in the multi-level mode; as long as the second image is incomplete, (Continued)

repeating the copying, programming, and switching with further parts of the second image; and subsequently executing the second image instead of the first image.

17 Claims, 3 Drawing Sheets

(51) Int. Cl.
*G06F 9/32* (2018.01)
*G06F 9/445* (2018.01)
*G06F 12/02* (2006.01)

(58) Field of Classification Search
CPC ............. G06F 12/0223; G06F 12/0238; G06F 12/0246
USPC .................................................. 717/168–178
See application file for complete search history.

(56) References Cited

U.S. PATENT DOCUMENTS

| | | | | |
|---|---|---|---|---|
| 2007/0300205 A1* | 12/2007 | Scian | ........................ | G06F 8/65 717/106 |
| 2008/0163201 A1* | 7/2008 | Jogand-Coulomb | ... | G06F 9/441 717/178 |
| 2010/0169586 A1* | 7/2010 | Chang | .................. | G11C 11/5621 711/154 |
| 2013/0322169 A1* | 12/2013 | Goss | ........................ | G06F 12/00 365/185.02 |
| 2013/0345021 A1* | 12/2013 | Koizumi | ............. | B60W 30/194 477/98 |
| 2015/0301821 A1* | 10/2015 | Danne | ..................... | H04L 67/06 717/169 |
| 2017/0168725 A1* | 6/2017 | Tamura | ................. | G06F 3/0619 |

OTHER PUBLICATIONS

International Search Report dated May 24, 2018 of the corresponding International Application PCT/EP2018/055466 filed Mar. 6, 2018.

* cited by examiner

METHOD AND DEVICE FOR UPDATING A PROGRAM

CROSS-REFERENCE TO RELATED APPLICATIONS

The present application is the national stage of International Pat. App. No. PCT/EP2018/055466 filed Mar. 6, 2018, and claims priority under 35 U.S.C. § 119 to DE 10 2017 205 274.0, filed in the Federal Republic of Germany on Mar. 29, 2017, the content of each of which are incorporated herein by reference in their entireties.

FIELD OF THE INVENTION

The present invention relates to a method for updating a program. In addition, the present invention relates to a corresponding device, a corresponding computer program, and a corresponding memory medium.

BACKGROUND

A non-volatile electronic memory component whose content is able to be electrically erased is known to one skilled in the art as an electrically erasable programmable read-only memory (EEPROM). Within the scope of the following statements, the term "EEPROM" is used in a broad sense of the word and in addition to conventional EEPROMs, also encompasses the more recent so-called flash memories, which are erasable block by block. To allow for a non-volatile storage at a low energy consumption, these flash EEPROM memories are predominantly used in vehicle electronics according to the related art, where the information stored in individual memory cells is stored in the form of electrical charges on a floating gate or in a charge-trapping memory element of a metal insulator semiconductor field-effect transistor (MISFET). In this case, the memory cells are basically disposed as a matrix in what is known as a cell array, and via a coordinate, the address lines are used for selecting a column or line of memory cells, and in the other coordinate, data lines lead to the memory cells.

In an effort to increase the storage density, multi-level cells (MLC) in which more than one bit per line is stored are sometimes used in this context. To make this possible, the charge quantity stored in a memory cell is dosed more finely and is also evaluated more precisely during the readout in order to be able to distinguish more than two possible states and to store more than one bit. In comparison with a single-level cell (SLC), this has the disadvantage of a reduced read and write speed. An MLC also reacts with considerably greater sensitivity to possible charge losses.

In DE 102014223035 A1, a method is introduced for transmitting data within a computer system between a memory interface of a volatile memory, a memory interface, in particular an MLC-NAND memory, and an interface of a microcontroller, the method including the reading in of data from the memory interface of the MLC-NAND memory at the start of a booting process of the microcontroller and the provision of the read-in data to the memory interface of the volatile memory.

SUMMARY

The present invention introduces a method for updating a program, a corresponding device, a corresponding computer program, and a corresponding memory medium.

The approach according to the present invention is based on the recognition that, due to the high cost of an update of the software (SW) of electronic vehicle systems requiring a workshop visit, the program or system images including the commands and data are increasingly modified over the air interface (over the air, OTA). There are different possibilities for executing such an update, but each of them has different advantages and disadvantages.

One conventional method is based on holding two system images in readiness. In the case of an engine control, for example, the engine operation is maintained using one system image, while a new system image is installed on the respective control unit (electronic control unit ECU). During the next start of the engine, the control unit is able to be operated on the basis of the new system image.

In order to support this conventional method, twice as much memory space as in a control unit without an OTA capability is required since both system images must be accommodated in the non-volatile memory (NVM) at the same time. This has the disadvantage of high unit costs during the production of corresponding control units, regardless of whether the vehicle manufacturer or the original equipment manufacturer (OEM) ultimately utilizes their OTA-capability.

It is therefore provided to use memory cells as MLCs, i.e., at least in a two-level form, for the duration of the storing of two system images for updating purposes. One advantage of this method is its reduced memory cell requirement in comparison with conventional methods. Instead, only a fraction of the additional memory capacity is required by utilizing the MLC technology.

According to an example embodiment of the present invention, a method is used within the scope of OTA updates in a vehicle control unit on the basis of a microcontroller (µC). In this way, a decision is able to be made in the application as to whether to use a µC offering more flash memory in the conventional manner, entailing a corresponding cost disadvantage, or to instead accept a reduced system performance in the interim in order to have the two memory images available for an OTA in the NVM.

Example embodiments of the present invention are illustrated in the figures and discussed in greater detail in the following description.

DETAILED DESCRIPTION

Figure 1:
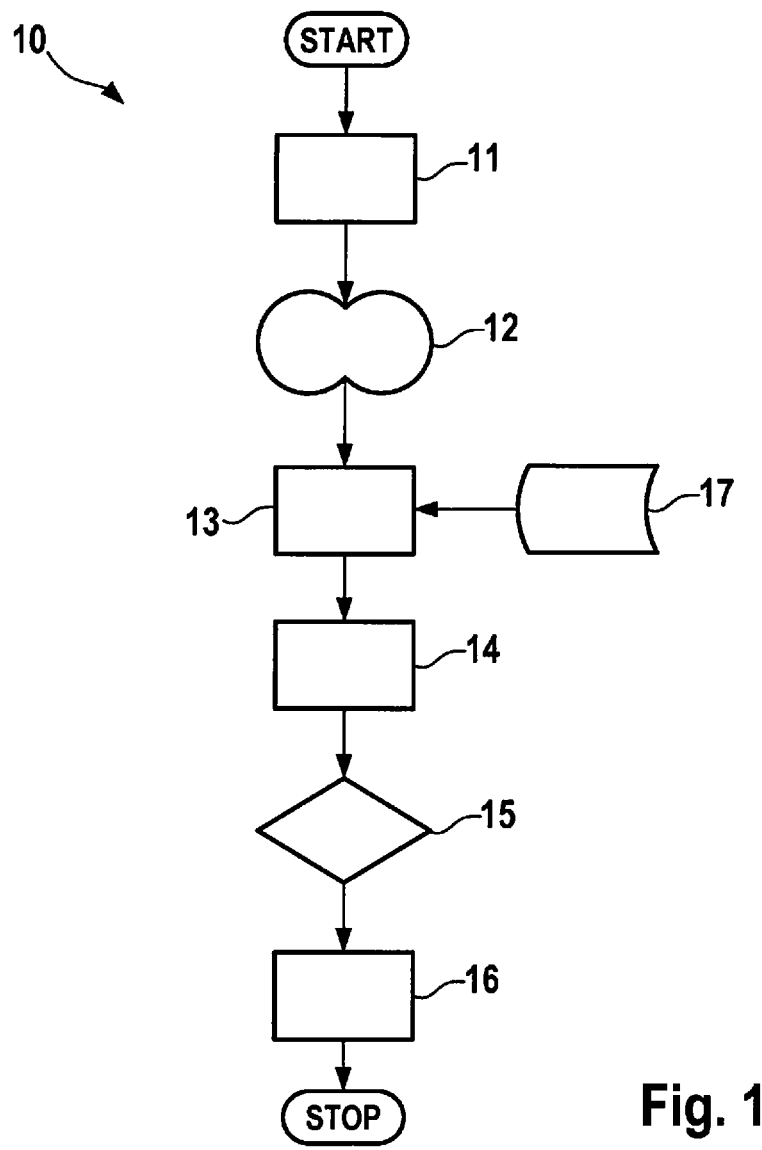
FIG. 1 is a flowchart that illustrates a method according to an example embodiment of the present invention.

FIG. 1 illustrates basic functional aspects of a method 10, which will now be described in a synoptic view using one of FIGS. 2-6 in each case. In the latter figures, cells that are operated in the SLC mode are illustrated by a solid line, whereas cells operated in the MLC mode are shown by a dashed line.

Figure 2:
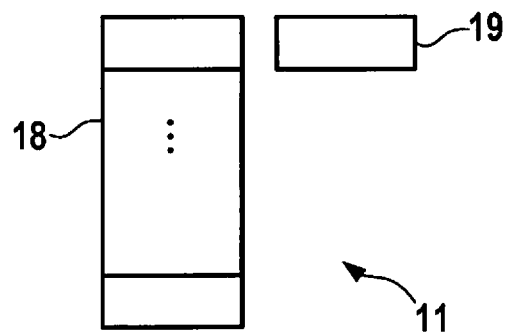
FIG. 2 schematically represents a first step of the method according to an example embodiment of the present invention.

FIG. 2 initially shows a normal operating state 11, in which a first image of the program is executed in a contiguous memory space 18 while the cells of all memory blocks are operated as SLCs, i.e., as single level cells. An individual block can include 1 Mbyte in each case, and a backup block 19 of the same size, which is not necessarily encompassed by the address space 18 of the program and initially not yet utilized for the upcoming updating, is available for the upcoming update.

Figure 3:
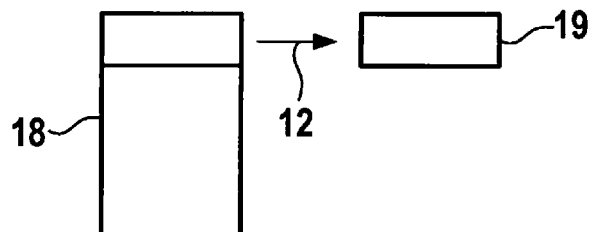
FIG. 3 schematically represents a second step of the method according to an example embodiment of the present invention.

FIG. 3 illustrates the configuration following the request of a new image. Here, the content of a block was copied to the backup block 19. The address range originally allocated to the original block is now imaged onto the backup block 19 in hardware terms, which thus is quasi "superimposed" in the address space 18 of the program from the point of view of the running program.

Figure 4:
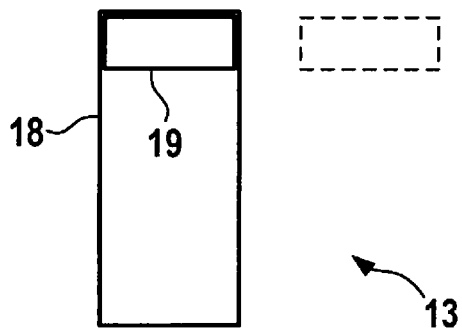
FIG. 4 schematically represents a third step of the method according to an example embodiment of the present invention.

As illustrated in FIG. 4, the original block is now able to be switched to the MLC mode and in addition to the first part, a part of a second image 17, which corresponds to the block size, is able to be programmed 13. Since the block to be programmed is still quasi "exchanged" for the backup block 19 in the address space 18 of the program, the functional capability of the first image is not adversely affected by this programming operation.

Figure 5:
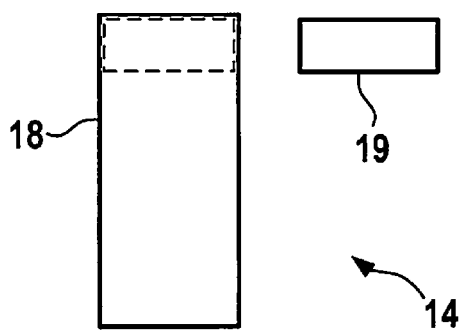
FIG. 5 schematically represents a fourth step of the method according to an example embodiment of the present invention.
Figure 6:
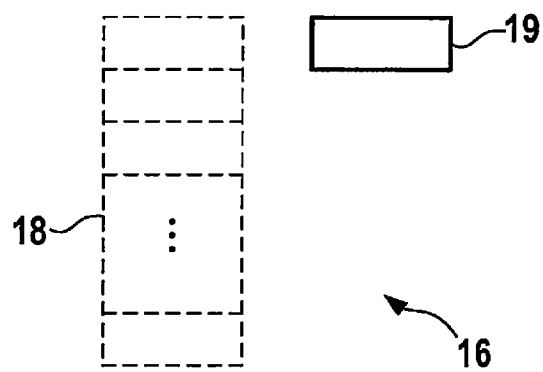
FIG. 6 schematically represents a result of the method according to an example embodiment of the present invention.

Then, the MLC block is able to be superimposed again in the above sense at the original address 14 while remaining in the multi-level mode, so that the first image can continue to be executed as in FIG. 5. A similar procedure is used for further blocks, until all blocks are in the MLC mode and both images are therefore completely present in the NVM (decision 15—FIG. 1), which corresponds to the state 16 according to FIG. 6.

In this final state 16, the first or second image of the program can optionally be executed. Once the functional capability of the second image 17 has been ensured—for instance in conjunction with different control units of a vehicle updated in this manner—the blocks can also be sequentially reset to the single level mode according to the reverse method in an effort to maximize the reliability of the program in a continuous operation.

Figure 7:
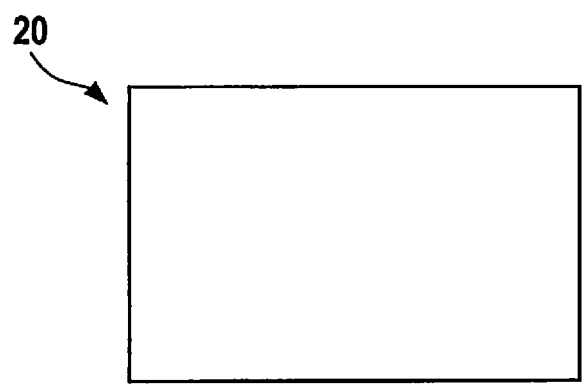
FIG. 7 schematically illustrates a control unit according to an example embodiment of the present invention.

For example, this method 10 can be implemented in software or hardware or in a mixed form of software and hardware, e.g., in a control unit 20, as illustrated by the schematic representation of FIG. 7.

What is claimed is:

1. A method for a program in a memory, the memory including a plurality of blocks in which the program is stored and a single backup block, the method comprising:
   executing a first version of the program (i) by accessing the program according to an address space that points to the plurality of blocks in which the program is stored and (ii) while the plurality of blocks are operated in a single level mode; and
   updating the program from the first version of the program to a second version of the program while the program remains executable partly from the plurality of blocks and partly from the single backup block, the updating being performed by:
   (1) executing a plurality of iterations of a series of steps, wherein the iterations are executed until an entirety of the second version is transferred onto the plurality of blocks and wherein the steps of each respective one of the iterations include:
      copying a respective part of the first version of the program from a respective one of the plurality of blocks to the single backup block;
      switching a respective portion of the address space, corresponding to the respective part of the first version of the program, from (a) pointing to the respective one of the plurality of blocks to instead (b) point to the single backup block;
      setting the respective one of the plurality of blocks to a multi-level mode;
      while the respective one of the plurality of blocks is set to the multi-level mode and the respective portion of the address space points to the single backup block, storing a respective part of the second version of the program on the respective one of the plurality of blocks so that the respective one of the plurality of blocks simultaneously stores the respective part of the first version of the program and the respective part of the second version of the program; and
      switching the respective portion of address space back from (a) pointing to the single backup block to instead (b) point to the respective one of the plurality of blocks while the one of the blocks remains in the multi-level mode, thereby freeing the single backup block to be able to be used for any other of the iterations if any other of the iteration are still to be performed; and
   (2) subsequent to the execution of all of the iterations at which point none of the address space points to the single backup block, executing an entirety of the second version of the program in place of the first version of the program by accessing the program according to the address space that points to the plurality of blocks.

2. The method of claim 1, further comprising:
increasing an access time with which the memory is operated to allow for an evaluation of information of the memory while the plurality of blocks are in the multi-level mode.

3. The method of claim 1, wherein:
the processor is operable in a normal single level cell (SLC) mode for accessing the plurality of blocks when they are in the single level mode; and
the processor is operable in a multi-level cell (MLC) mode for accessing the plurality of blocks when they are in the multi-level mode, in which an access time is longer, and a performance is therefore lower, than when the processor is operated in the SLC mode.

4. The method of claim 1, wherein the program, when executed, causes control of a field device in a motor vehicle.

5. The method of claim 4, wherein the second version of the program is transmitted via an air interface to the motor vehicle prior to the updating.

6. The method of claim 1, wherein the program, when executed, causes control of a combustion engine in a motor vehicle.

7. The method of claim 1, wherein the memory is non-volatile.

8. The method of claim 7, wherein the memory is a flash EEPROM.

9. The method of claim 8, wherein the memory is a NAND flash.

10. The memory of claim 8, wherein the memory is a NOR flash.

11. The method of claim 1, wherein the switching of all of the plurality of blocks back to the single level mode by executing another plurality of iterations, each iteration of which using the single backup block in order to switch a respective one of the plurality of blocks to the single level mode.

12. The method of claim 1, wherein the single backup block is set to the single level mode throughout the execution of the plurality of iterations.

13. The method of claim 1, wherein the execution of the second version of the program in place of the first version of the program is performed while all of the plurality of blocks are still in the multi-level mode due to the execution of the plurality of iterations.

14. The method of claim 13, further comprising:
monitoring a functional capability of the second version of the program during the execution of the second version of the program; and
resetting all of the plurality of blocks back to the single level mode so as to store only the second version of the program in response to a result of the monitoring being that the functional capability of the second version of the program is determined to be ensured.

15. A non-transitory computer-readable medium on which are stored instructions that are executable by a processor and that, when executed by the processor, cause the processor to perform a method for a program in a memory, the memory including a plurality of blocks in which the program is stored and a single backup block, the method comprising:
executing a first version of the program (i) by accessing the program according to an address space that points to the plurality of blocks in which the program is stored and (ii) while the plurality of blocks are operated in a single level mode; and
updating the program from the first version of the program to a second version of the program while the program remains executable partly from the plurality of blocks and partly from the single backup block, the updating being performed by:
(1) executing a plurality of iterations of a series of steps, wherein the iterations are executed until an entirety of the second version is transferred onto the plurality of blocks and wherein the steps of each respective one of the iterations include:
copying a respective part of the first version of the program from a respective one of the plurality of blocks to the single backup block;
switching a respective portion of the address space, corresponding to the respective part of the first version of the program, from (a) pointing to the respective one of the plurality of blocks to instead (b) point to the single backup block;
setting the respective one of the plurality of blocks to a multi-level mode;
while the respective one of the plurality of blocks is set to the multi-level mode and the respective portion of the address space points to the single backup block, storing a respective part of the second version of the program on the respective one of the plurality of blocks so that the respective one of the plurality of blocks simultaneously stores the respective part of the first version of the program and the respective part of the second version of the program; and
switching the respective portion of address space back from (a) pointing to the single backup block to instead (b) point to the respective one of the plurality of blocks while the one of the blocks remains in the multi-level mode, thereby freeing the single backup block to be able to be used for any other of the iterations if any other of the iteration are still to be performed; and
(2) subsequent to the execution of all of the iterations at which point none of the address space points to the single backup block, executing an entirety of the second version of the program in place of the first version of the program by accessing the program according to the address space that points to the plurality of blocks.

16. A device comprising a processor, wherein the processor is configured to perform a method for a program in a memory, the memory including a plurality of blocks in which the program is stored and a single backup block, the method comprising:
executing a first version of the program (i) by accessing the program according to an address space that points to the plurality of blocks in which the program is stored and (ii) while the plurality of blocks are operated in a single level mode; and
updating the program from the first version of the program to a second version of the program while the program remains executable partly from the plurality of blocks and partly from the single backup block, the updating being performed by:
(1) executing a plurality of iterations of a series of steps, wherein the iterations are executed until an entirety of the second version is transferred onto the plurality of blocks and wherein the steps of each respective one of the iterations include:
copying a respective part of the first version of the program from a respective one of the plurality of blocks to the single backup block;
switching a respective portion of the address space, corresponding to the respective part of the first version of the program, from (a) pointing to the respective one of the plurality of blocks to instead (b) point to the single backup block;
setting the respective one of the plurality of blocks to a multi-level mode;
while the respective one of the plurality of blocks is set to the multi-level mode and the respective portion of the address space points to the single backup block, storing a respective part of the second version of the program on the respective one of the plurality of blocks so that the respective one of the plurality of blocks simultaneously stores the respective part of the first version of the program and the respective part of the second version of the program; and
switching the respective portion of address space back from (a) pointing to the single backup block to instead (b) point to the respective one of the plurality of blocks while the one of the blocks remains in the multi-level mode, thereby freeing the single backup block to be able to be used for any other of the iterations if any other of the iteration are still to be performed; and
(2) subsequent to the execution of all of the iterations at which point none of the address space points to the single backup block, executing an entirety of the second version of the program in place of the first version of the program by accessing the program according to the address space that points to the plurality of blocks.

17. The device of claim 16, wherein the device is a microcontroller.

\* \* \* \* \*